3,560,857
PULSE REGENERATING REPEATER
Tsuneo Nakahara, Yasuo Shimizu, and Yuji Kosaka, Nishinomiya, Japan, assignors to Sumitomo Electric Industries, Ltd., Osaka, Japan, a company of Japan
Filed Aug. 24, 1966, Ser. No. 574,764
Claims priority, application Japan, Aug. 25, 1965, 40/51,792
Int. Cl. H04b 3/58
U.S. Cl. 325—38
12 Claims

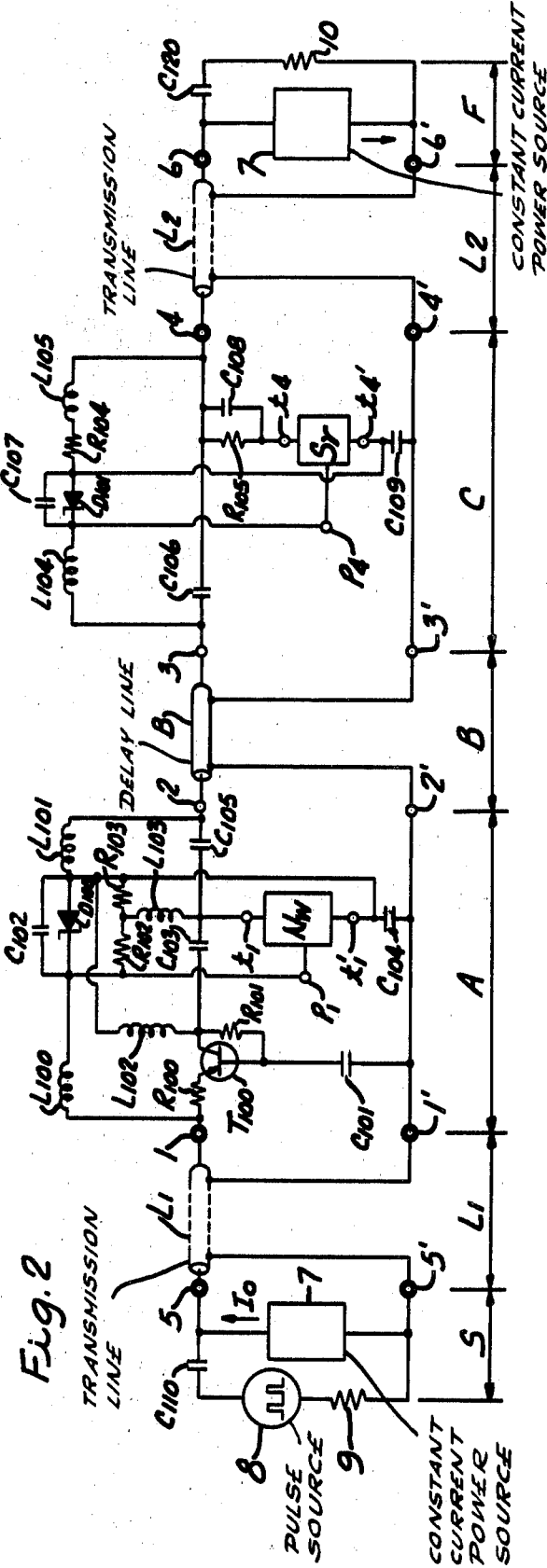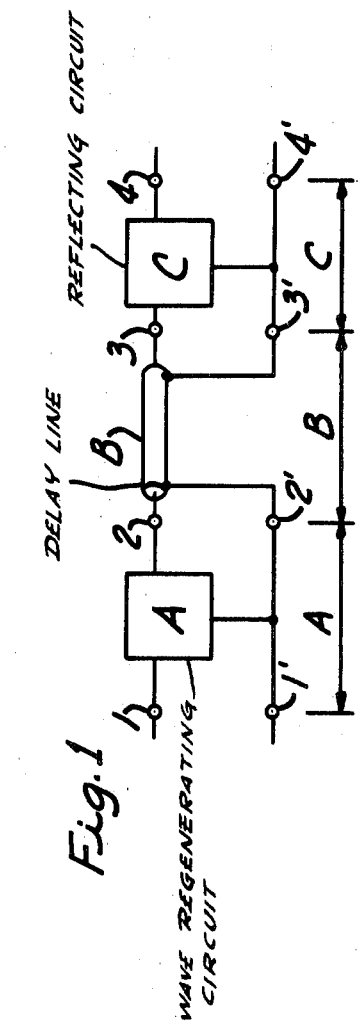

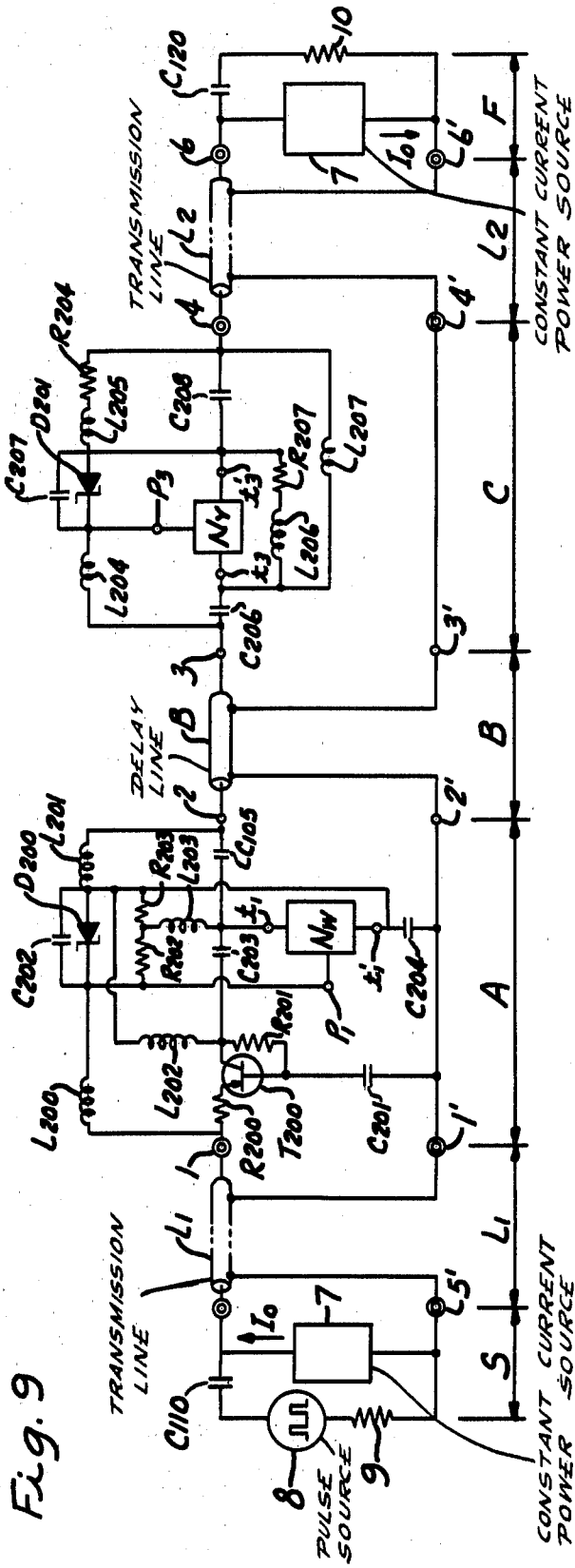
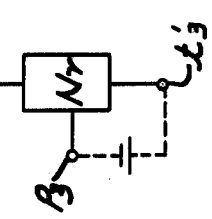
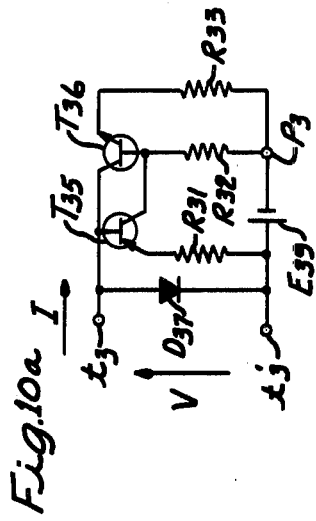

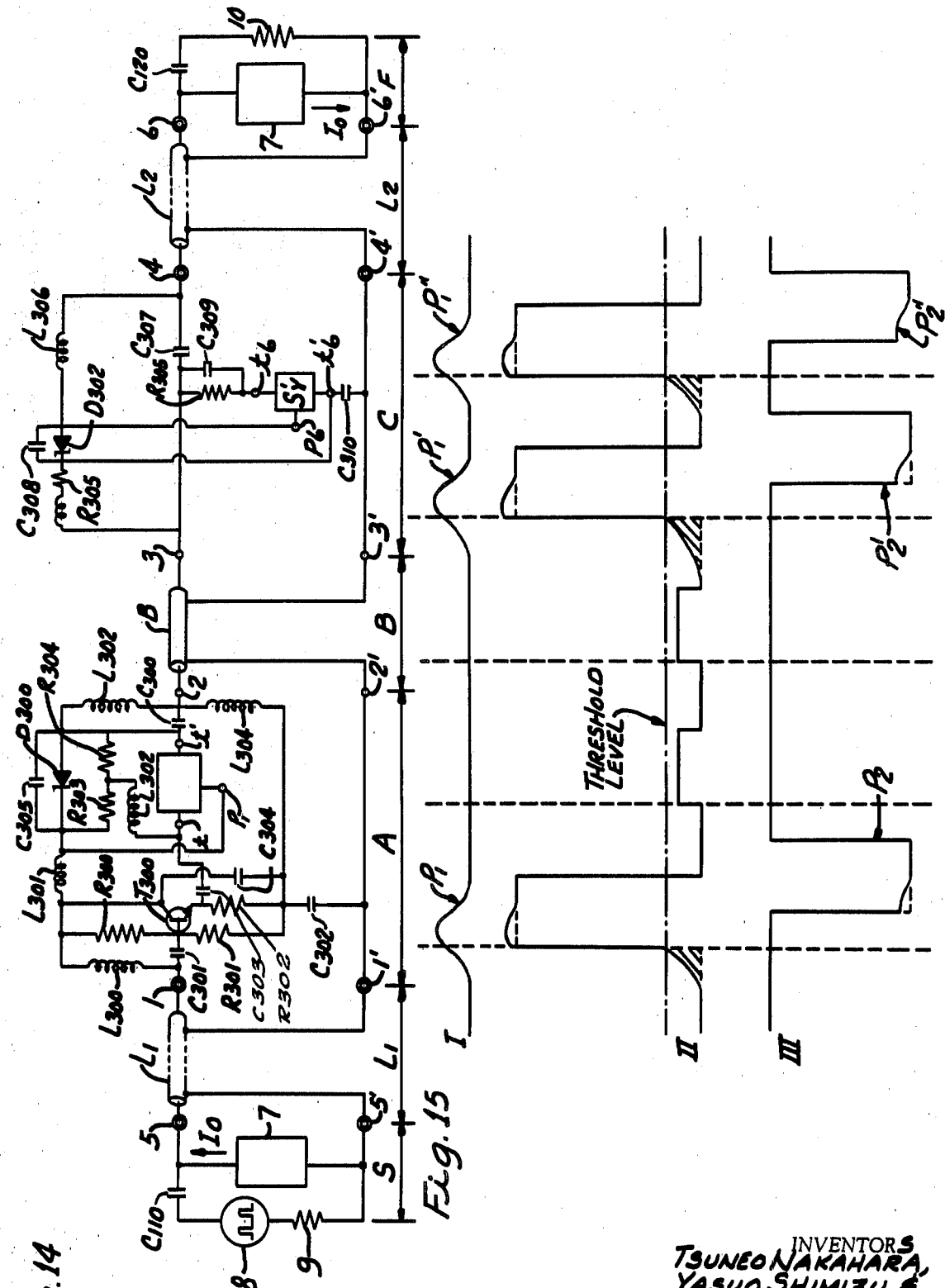

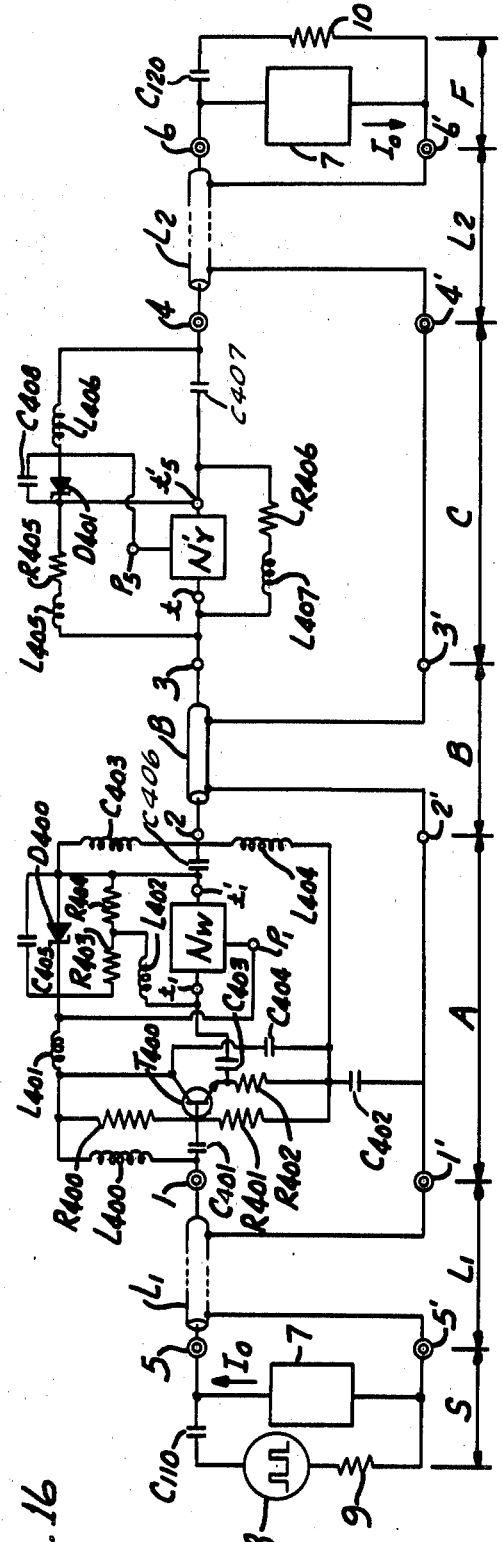
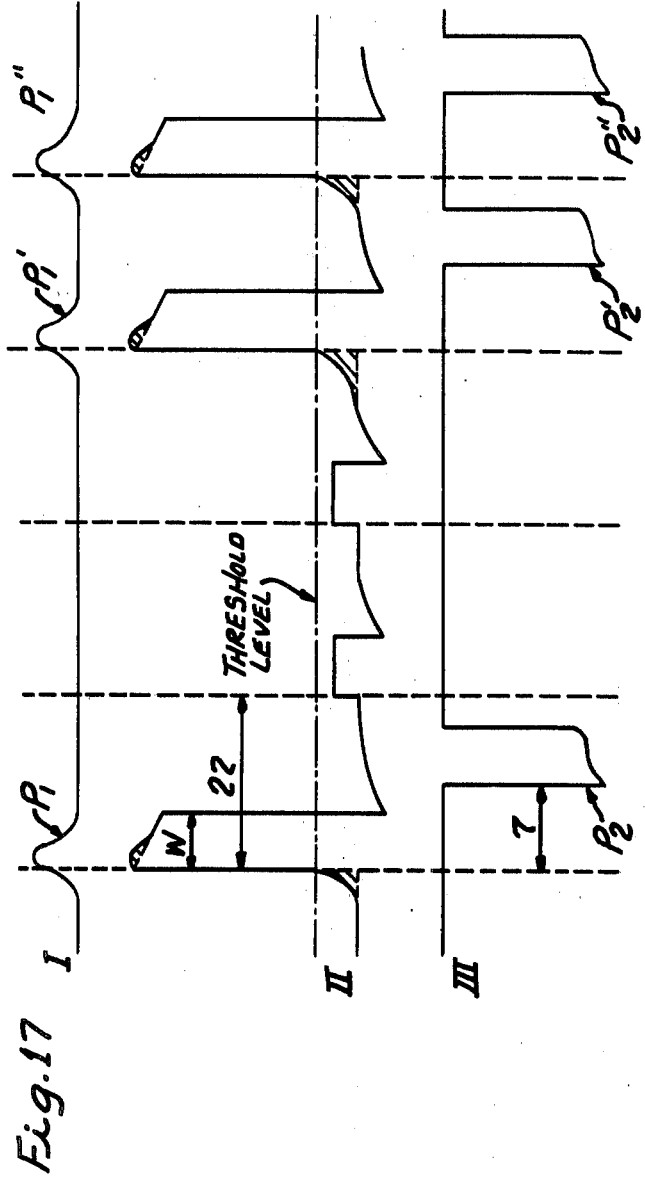
Fig. 16
Fig. 17

ABSTRACT OF THE DISCLOSURE

A pulse regenerating repeater to be installed in cascade in a transmission line to regenerate attenuated pulses wherein the repeater consists of a series connection of a wave regenerating circuit, a delay line and a reflecting circuit respectively. An attenuated and phase jittered input pulse is regenerated by the wave regenerating circuit and then propagated on the delay line and the portion of the regenerated pulse which is above a preselected critical value of the reflecting circuit is passed therethrough for transmission and the remaining portion below this critical value is reflected to form a timing pulse which is shuttled back and forth on the delay line. The simultaneous presence of an input pulse and a timing pulse at the wave regenerating circuit triggers a negative resistance device therein, whereby the pulse is regenerated such that the retiming of the regenerated pulse is controlled at the original fundamental frequency by the timing pulse.

---

Figure 4:
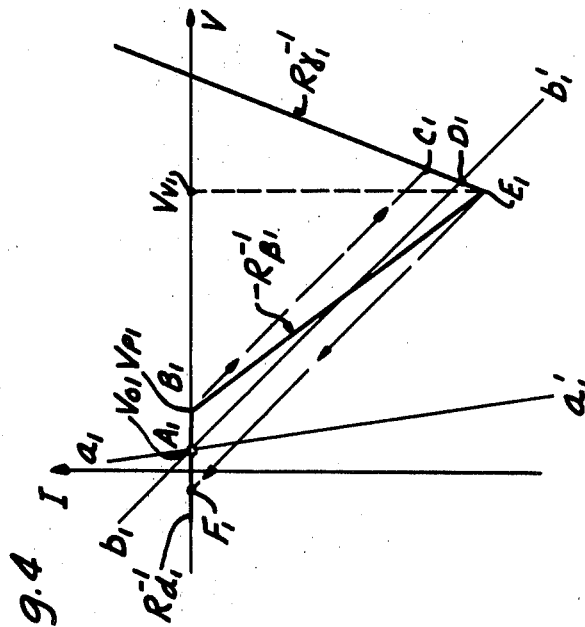

The present invention relates to pulse regenerating repeaters for a pulse transmission system. More particularly, it relates to a pulse regenerating repeater wherein a wave is regenerated and transmitted, the series of pulses which have deteriorated as propagated along the transmission line being regenerated to correct values and positioned on the time axis to have correct time intervals between pulses.

If a pulse is transmitted by a transmission line, the amplitude of the pulse attenuates owing to the transmission loss. It is, consequently, necessary to regenerate the wave by interposing repeaters at suitable intervals. With pulse transmission, on the other hand, not only the amplitude of the pulse is important, but the frequency of the pulse is also important. If the interval between pulses arriving at the receiving terminal is in disorder, it is impossible to obtain correct information even if the amplitude of the pulse arriving there is great enough. The controlling of the time of wave regeneration at each repeater on the basis of some time standard for the purpose of keeping the pulse interval at a constant value is called retiming.

The object of the present invention is to obtain a pulse regenerating transmission line which has a retiming function based on a new principle. The method of retiming which has hitherto been employed commonly is one wherein the fundamental frequency of the pulse train is extracted by a resonating oscillation system based on the combination tank circuit of inductance and capacitance and the time for wave regeneration is thereby determined. The method of the present invention, on the other hand, effects retiming by making use of a forced oscillation system based on the shuttling phenomenon on a transmission line of a fixed length instead of the resonating phenomenon of the LC circuit. That is to say, a part of the energy of the output pulse made by the wave regenerating circuit ins caused to continue shuttling on a transmission line of a fixed length the ends of which are terminated under suitable conditions, and the fact that the shuttling takes place at a fixed interval because the speed of the pulse proceeding along this transmission line is constant, is utilized for effecting the retiming. It has a characteristic feature in that a retiming of greater stability and higher quality can be effected by a simple structure which does not necessitate an LC resonating circuit.

It is possible to use a part of the transmission line itself as the said transmission line of a fixed length for retiming. That is to say, it is possible to construct a pulse regenerating transmission line having the retiming function based on the principle of the present invention by placing a wave regenerating circuit and non-linear active reflecting circuit with a fixed section of the transmission line in-between. This wave regenerating circuit and non-linear active reflecting circuit can both be simply realized by the use of a 2-terminal negative resistance device. Thus it is another object of the present invention to obtain a pulse regenerating transmission line having retiming function, with these two circuits insalled in a transmission line with a fixed section of the transmission line interposed between them.

The fact that the present invention attains the aforementioned objects will be made clear if its embodiments are studied with reference to the drawings as explained below.

Other objects and advantages appear hereinafter in the following description and claims.

Figure 6:
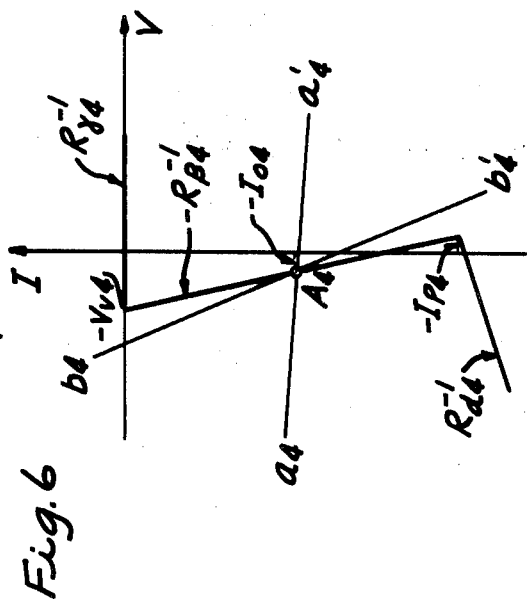
Figure 3B:
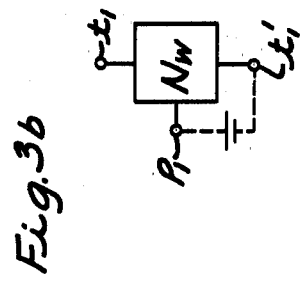
Figure 5B:
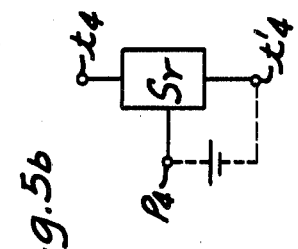
Figure 3A:
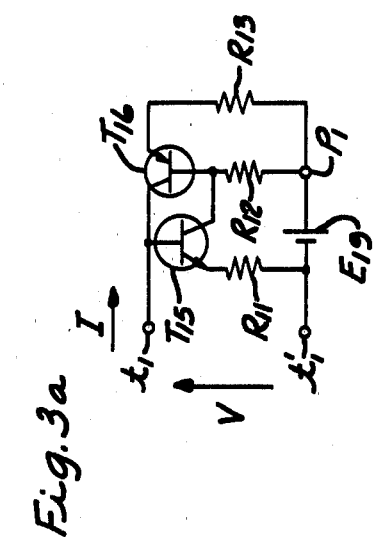
Figure 5A:
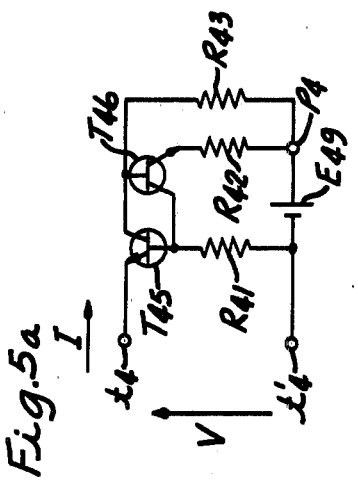
Figure 7:
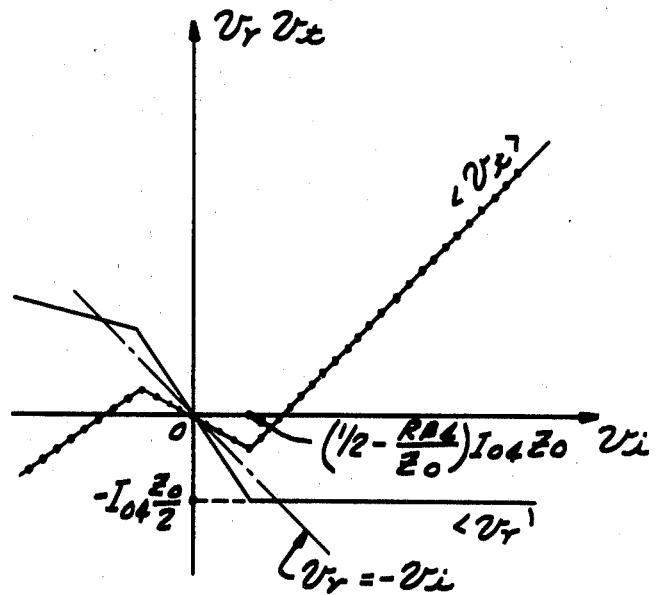
Figure 8:
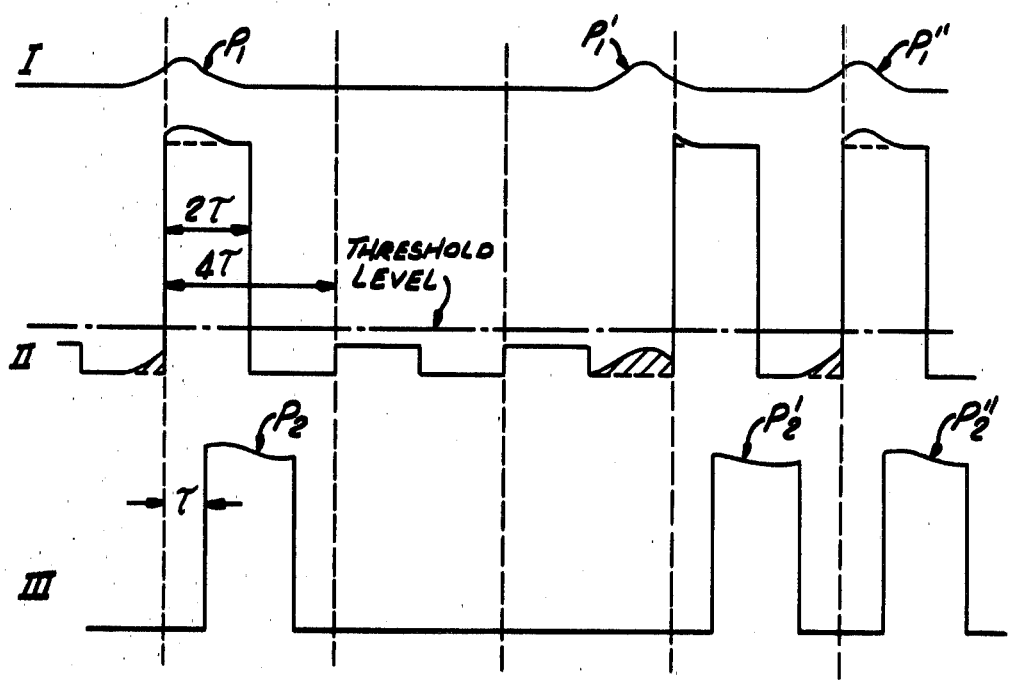
Figure 11:
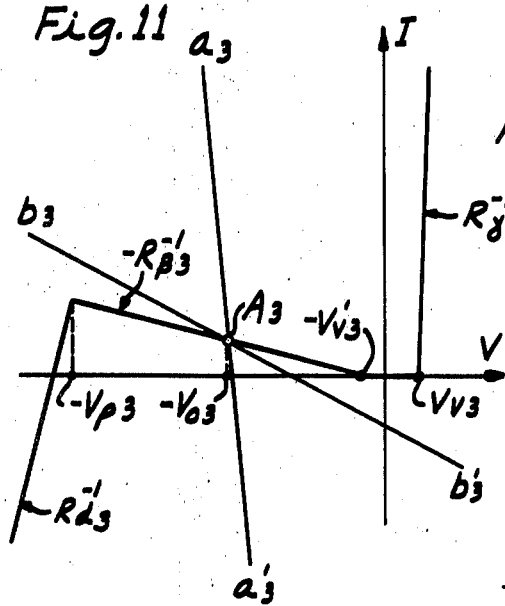
Figure 12:
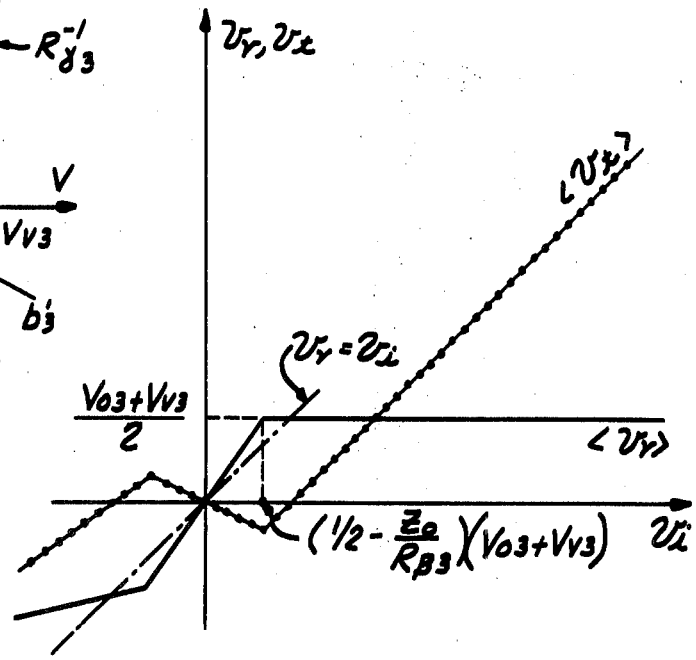
Figure 13:
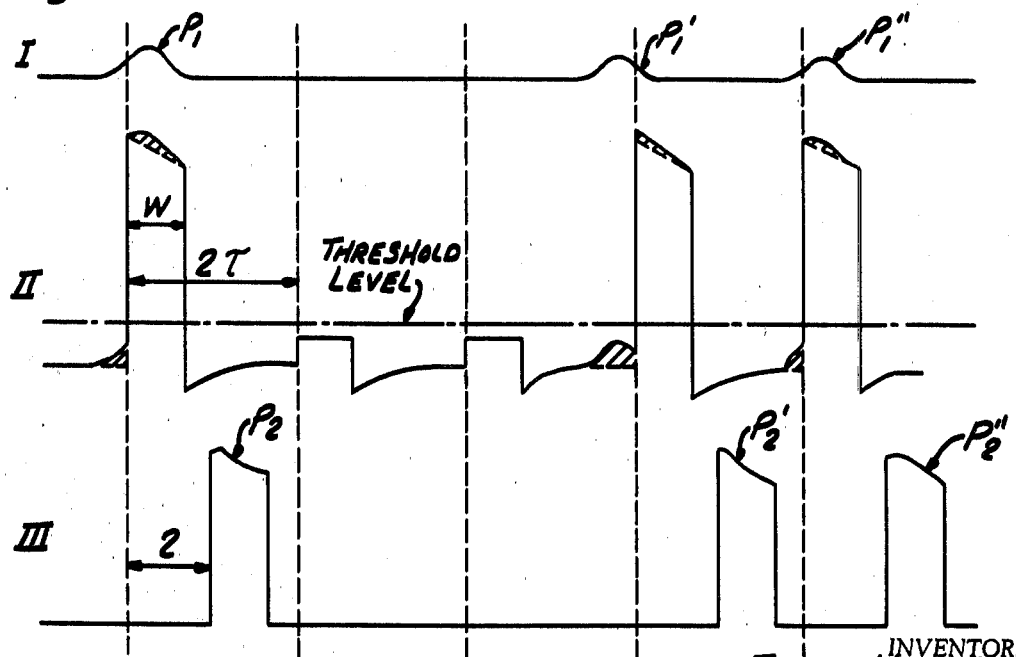
Figure 20:
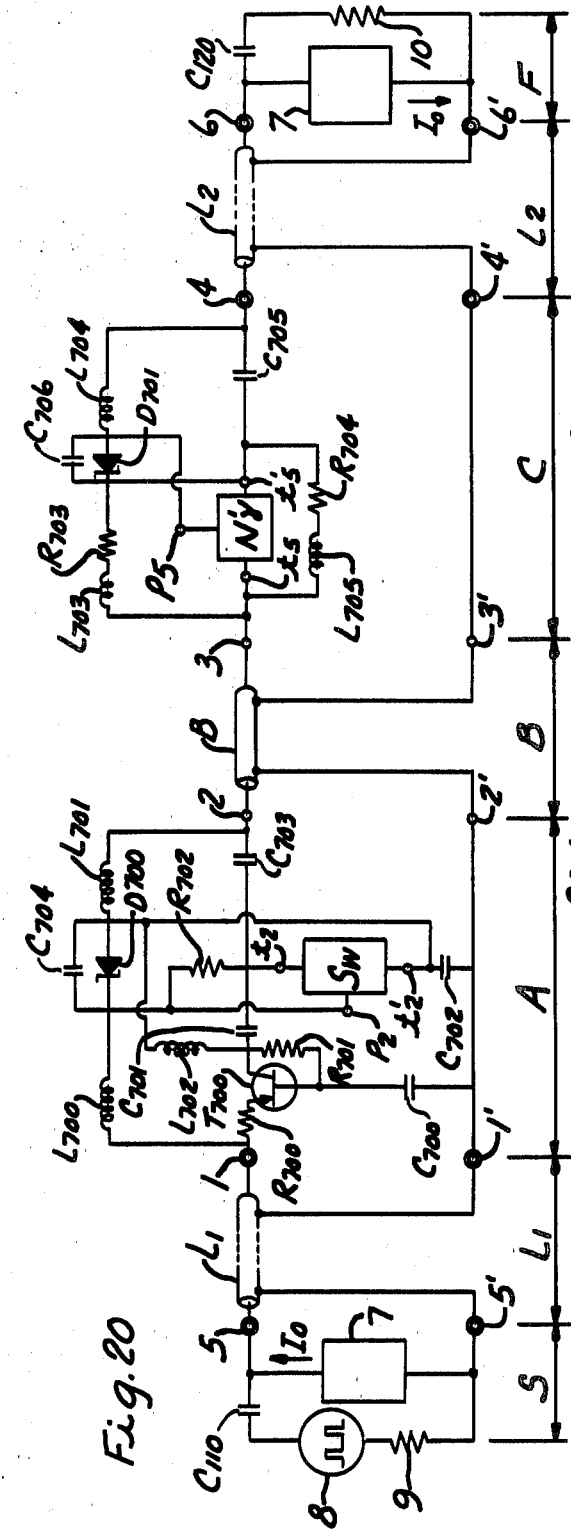
Figure 21:
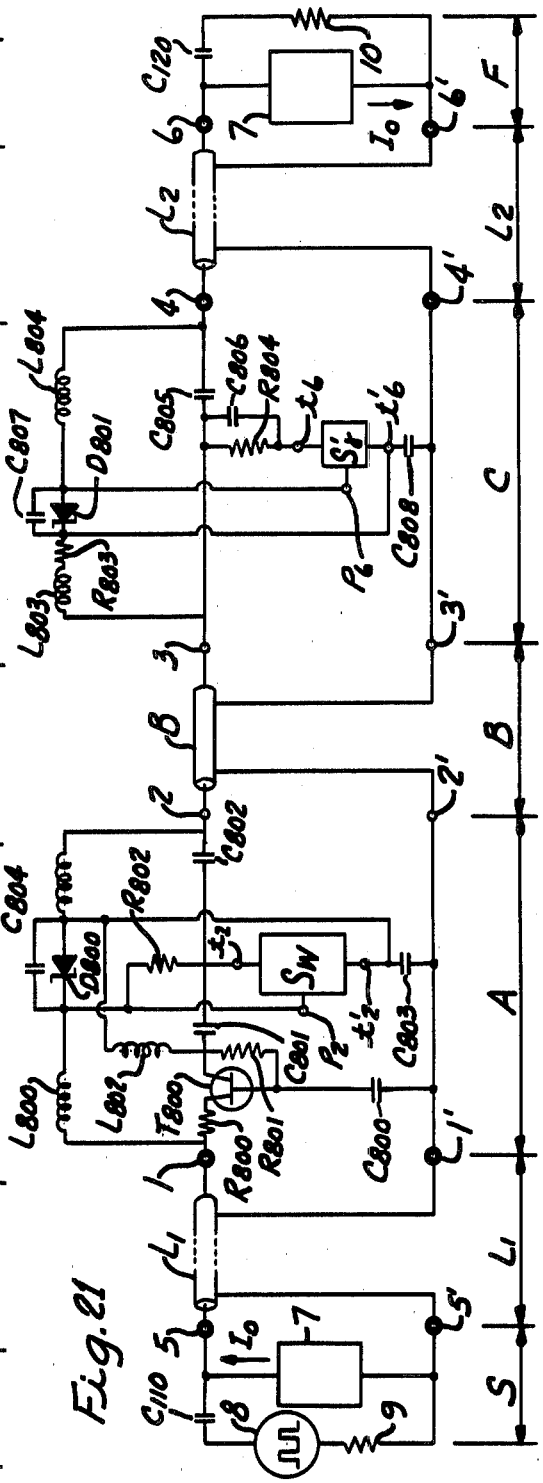
Figure 22A:
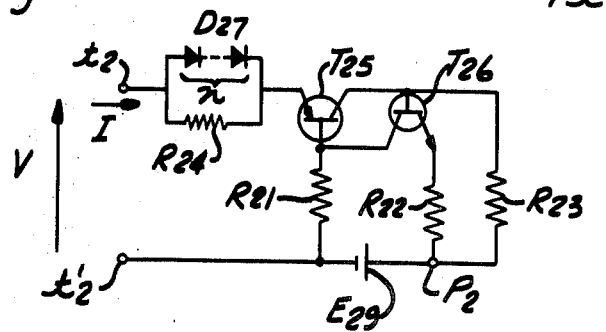
Figure 22B:
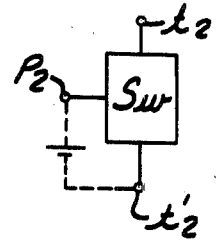
Figure 23:
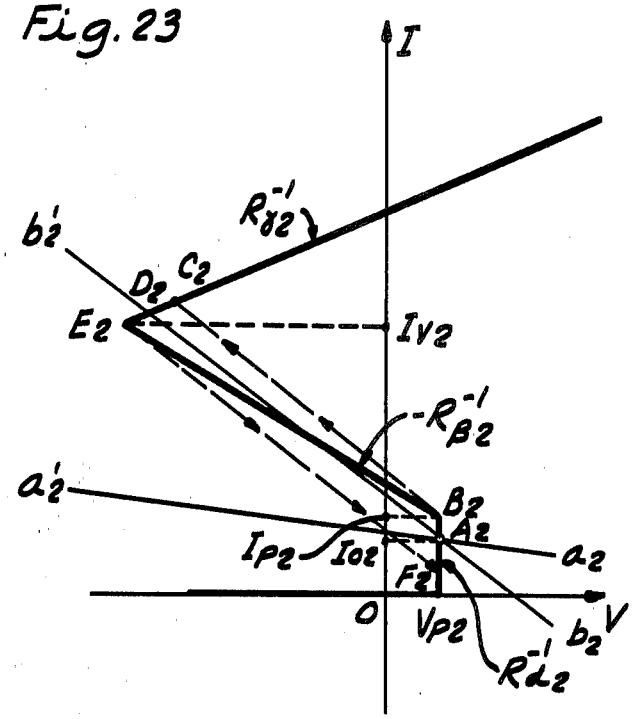

The accompanying drawings show for the purpose of exemplification without limiting the invention or claims thereto, certain practical embodiments illustrating the principles of this invention wherein:

FIG. 1 is a schematic diagram showing the basic principle of the present invention. FIG. 2 is a schematic diagram showing an embodiment of the invention. FIGS. 3a and 3b are schematic diagrams showing the construction of a composite transistor circuit. FIG. 4 is a graph showing the voltage-current (V-I) characteristic of the circuit of FIG. 3. FIGS. 5a and 5b are schematic diagrams showing the construction of a composite transistor circuit. FIG. 6 is a graph showing the V-I characteristic of the circuit of FIG. 5. FIG. 7 is a graphical plot showing the reflection characteristic and transmission characteristic of Block C of FIG. 2. FIG. 8 is a graphical illustration showing the operation of the embodiment of FIG. 2. FIG. 9 is a schematic diagram showing another embodiment of the present invention. FIGS. 10a and 10b are schematic diagrams showing the construction of a composite transistor circuit. FIG. 11 is a graphical plot showing the V-I characteristic of the circuit of FIG. 10. FIG. 12 is a graphical plot showing the reflection characteristic and transmission characteristic of Block C of FIG. 9. FIG. 13 is a graphical illustration showing the operation of the embodiment of FIG. 9. FIG. 14 is a schematic diagram showing another embodiment of the present invention. FIG. 15 is a graphical illustration showing the operation of the embodiment of FIG. 14. FIG. 16 is a schematic diagram showing another embodiment of the present invention. FIG. 17 is a graphical illustration showing the operation of the embodiment of FIG. 16. FIGS. 18, 19, 20 and 21 are schematic diagrams, each showing different embodiments of the present invention. FIGS. 22a and 22b are schematic diagrams showing the construction of a composite transistor circuit. FIG. 23 is a graphical plot showing the V-I characteristic of the circuit of FIG. 22.

FIG. 1 is a diagram showing the basic principle of the present invention. The structure from terminals 1–1' to terminals 4–4' constitutes one repeating block.

One repeating block of this invention consists of the three blocks A: wave regenerating circuit, B: pulse delay line and C: nonlinear active reflecting circuit. A is a pulse circuit having a threshold level and makes wave regeneration. B is a delay line of a fixed length and gives a fixed delay to the pulse. C is a non-linear amplifying reflecting circuit. It has such a reflection characteristic that if the amplitude of the incident pulse coming from 3–3' is smaller than a certain value, it reflects the pulse with amplification, while the amplitude of the reflected pulse for the incident pulse having a larger amplitude than a certain value is saturated at the fixed value.

Since the amplitude of the regenerated pulse of the wave regenerating circuit A is made sufficiently greater than the critical value at which the reflection characteristic of the non-linear active reflecting circuit C enters the region of saturation, only a part of its energy is reflected by the reflecting circuit C, a greater part of it passing through the reflecting circuit C without being reflected and being sent out to the next stage to become output pulse. A part of the energy of the regenerated pulse made by the wave regenerating circuit A becomes a small amplitude pulse which returns to the wave regenerating circuit A. If the reflection at terminals 2–2' of this small amplitude pulse due to the selected terminal impedance of circuit A is made a reflection with small loss, the said small amplitude pulse can be caused to shuttle continuously on the pulse delay line B limited between the wave regenerating circuit A and the reflecting circuit C by having the reflection loss at the wave regenerating circuit A and the transmission loss at the delay line B almost compensated by the reflection gain at the reflecting circuit C. As this shuttling phenomenon is a cyclic phenomenon having a fixed cycle proportional to the pulse propagation time on the delay line B, the retimed regeneration can be made by controlling the point of time of wave regeneration by the wave regenerating circuit A by means of the aforementioned small amplitude pulse applied from terminals 2–2'. Naturally it is necessary that the wave regenerating circuit A should be such a pulse circuit that is triggered by the energy which is the sum of the input pulse applied to terminals 1–1' and the small amplitude pulse for timing applied from terminals 2–2'.

FIG. 2 shows an embodiment of the present invention. In FIG. 2, pulse source block (S) comprises pulse generator 8 with impedance 9, coupling condenser $C_{110}$ and constant current power source 7 to supply each repeating block, transmission blocks $L_1$ and $L_2$ comprise transmission lines and repeating blocks and load block F comprises load 10, coupling condenser $C_{120}$ and constant current power source 7.

The part from terminals 1–1' to terminals 2–2' corresponds to the block A of FIG. 1, the line B to the block B and the part from terminals 3–3' to terminals 4–4' to the block C.

The pulse delay line B may either be one of the same type as other transmission lines or be some other special delay line. For convenience in explaining, however, the characteristic impedance of all the lines will be considered to be $Z_0$.

From the pulse generator 8 of impedance 9, pulses are transmitted to the load 10 through the whole pulse transmission line, and each repeater circuit inserted in the transmission line is supplied with electric power by Zener diode biased by D.C. current supplied to the line by constant current sources 7, 7 which are connected to the terminal ends or source and load ends of the transmission line.

In FIG. 2, condensers $C_{101}$–$C_{109}$ are all coupling condensers or bypass condensers, and show impedance small enough for signals. Inductances $L_{100}$–$L_{105}$ are all choke coils and show impedance large enough for signals.

The block A comprises an impedance converter using transistor $T_{100}$ of a common-base configuration and a bistable biased composite transistor circuit $N_w$ showing N-type (voltage regulated type) negative resistance.

Regulated by the resistances $R_{100}$ and $R_{101}$, the impedance converter has an input impedance equal to the impedance $Z_0$ of the line and an output impedance sufficiently greater enough than $Z_0$. The composite transistor circuit $N_w$ is a circuit as shown in FIG. 3(a), represented by a symbol given in FIG. 3(b). In FIG. 3(a), $t_1$, $t_1'$ and $P_1$ are terminals, $T_{15}$ and $T_{16}$ are transistors, $R_{11}$, $R_{12}$ and $R_{13}$ are resistors, $E_{19}$ is a constant voltage power source. V shows a voltage applied between terminals $t_1$ and $t_1'$, and is defined to take positive value wherein a potential at terminal $t_1$ is higher than that at terminal $t_1'$. I shows a current which flows into terminal $t_1$ and flows out from terminal $t_1'$. The voltage-current characteristic of this circuit between the terminals $t_1$–$t_1'$ shows an N-type negative resistance as shown in FIG. 4.

There are two positive resistance regions which are separated by a negative resistance region in the voltage-current (V-I) characteristic curve shown in FIG. 4. The one at the smaller voltage side of the negative resistance region is called first positive resistance region, the other is called second positive resistance region.

The various values defining the V-I characteristic curve are as follows:

$V_{P1}$: a voltage of the transition point between the negative resistance region and the first positive resistance region $V_{V1}$: a voltage of the transition point between the negative resistance region and the second positive resistance region $R_{\alpha 1}^{-1}$: a gradient in conductance of the V-I curve in the first positive resistance region $-R_{\beta 1}^{-1}$: a gradient in conductance of the V-I curve in the negative resistance region $R_{\gamma 1}^{-1}$: a gradient in conductance of the V-I curve in the second positive resistance region These values are given in the following formulae using circuit constants shown in FIG. 3(a):

$$V_{P1} \simeq V d_{15} + \frac{R_{11}}{R_{12}} V d_{16}$$

$$V_{V1} \simeq \frac{R_{11}}{R_{11}+R_{12}} E_{19}$$

$$R_\alpha^{-1} \simeq 0$$

$$-R_{\beta 1}^{-1} \simeq -\frac{R_{12}}{R_{11} \cdot R_{13}}$$

$$R_\gamma^{-1} \simeq \frac{1}{R_{11}} + \frac{1}{R_{12}} + \frac{1}{R_{13}}$$

where, $V d_{15}$ and $V d_{16}$ are the emitter diffusion potentials of transistors $T_{15}$ and $T_{16}$ respectively. As regards the composite transistor circuit used in the embodiments of this invention, reference to Belgian Patent 551,746, for example, is suggested.

The composite transistor $N_w$ is biased at Point $A_1$ in FIG. 4 by Zener diode $D_{100}$ and resistances $R_{102}$, $R_{103}$, and choke coil $L_{103}$. The straight line $a_1$–$a_1'$ is a D-C load line. The straight line $b_1$–$b_1'$ is an A-C load line. As the output impedance of the impedance converter is great enough, this gradient is about $-Z_0^{-1}$.

Since the terminating impedance at terminals 2–2', which is comprised of the parallel connection of the output impedance of the impedance converter and the impedance of the $N_w$-bistable circuit in the area of the operating point $A_1$ as shown in FIG. 4, is very much larger than the characteristic impedance $Z_0$ of the line B, the small amplitude incident pulse (namely, the timing pulse) applied to the terminals 2–2' is reflected there with the same polarity and with a low reflection loss.

Since $R_{\alpha 1}^{-1} \simeq 0$, $N_w$ gives a high impedance against small amplitude pulses not exceeding threshold level $V_{P1} - V_{O1}$ in the proximity of Point $A_1$. If a positive input exceeding the threshold level is applied between $t_1$, $t_1'$, $N_w$ is triggered and, via Points $B_1$ and $C_1$, is switched to a high potential condition $D_1$ and generates a positive large amplitude voltage step. Point $D_1$ not being a direct-current-wise stable point, the operating point of circuit $N_w$ shifts gradually from $D_1$ to $E_1$ in accordance with a very large time constant determined mainly by $L_{103}$, but it may be considered to be an approximate stable point where the time is so short as compared to the interval of signal pulse repetition. If a negative input so large that the operating point of $N_w$ exceeds Point $E_1$ is applied to $N_w$ located at Point $D_1$, $N_w$ is again triggered and, via Points $E_1$, $F_1$, is switched to Point $A_1$ and generates a negative large amplitude voltage step. That is to say, $N_w$ in FIG. 2 effects a bistable action.

The block C is a circuit wherein a composite transistor circuit $S_r$ showing an S-type (current regulated type) negative resistance is stably biased in its negative resistance region and connected in parallel to the line. The composite transistor circuit $S_r$ is a circuit as shown in FIG. 5($a$) and is represented by a symbol given in FIG. 5($b$). In FIG. 5($a$), $t_4$, $t_4'$ and $P_4$ are terminals, $T_{45}$ and $T_{46}$ are transistors, $R_{41}$, $R_{42}$, $R_{43}$ are resistors, $E_{49}$ is a constant voltage power source. V shows a voltage applied between terminals $t_4$ and $t_4'$ and is defined to take positive value wherein a potential at $t_4$ is higher than that at terminal $t_4'$. I shows a current which flows into terminal $t_4$ and flows out from $t_4$. The voltage-current characteristic of this circuit between terminals $t_4$–$t_4'$ is of an S-type negative resistance as shown in FIG. 6. In FIG. 6 there are two positive resistance regions which are separated by a negative resistance region. The one at the smaller current side of the negative resistance region is called the first positive resistance region, the other is called the second positive resistance region.

The various characteristic values of the V-I characteristic curve are as follows:

—$I_{p4}$: a current of the transition point between the negative resistance region and the first positive resistance region
—$V_{v4}$: a voltage of the transition point between the negative resistance region and the second positive resistance region
$R_{\alpha 4}^{-1}$: a gradient in conductance of the V-I curve in the first positive resistance region
—$R_{\beta 4}^{-1}$: a gradient in conductance of the V-I curve in the negative resistance region
$R_{\gamma 4}^{-1}$: a gradient in conductance of the V-I curve in the second positive resistance region These values are given in the following formula using circuit constants shown in FIG. 5($a$):

$$-I_{P4} \simeq -\frac{R_{42}}{(R_{41}+R_{43})R_{43}} E_{49}$$

$$-V_{v4} \simeq -V d_{45}$$

$$R_{\alpha 4}^{-1} \simeq \frac{1}{R_{41}} + \frac{1}{R_{42}} + \frac{1}{R_{43}}$$

$$-R_{\beta 4}^{-1} \simeq -\frac{R_{42}}{R_{41} \cdot R_{43}}$$

$$R_{\gamma 4}^{-1} \simeq 0$$

Where, $V_{d45}$ is the emitter diffusion potential of transistor $T_{45}$.

The composite transistor circuit $S_r$ is biased at Point A by Zener diode $D_{101}$; resistances $R_{104}$, $R_{105}$; and coil $L_{105}$.

The straight line $a_4$–$a_4'$ is a D-C load line.

The straight line $b_4$–$b_4'$ is an A-C load line, and its gradient is $$=\frac{2}{Z_0}$$

The reflection characteristic and transmission characteristic at terminals 3–3' are shown in FIG. 7. The reflection coefficient $K_{r4}$ and transmission coefficient $K_{t4}$ at terminals 3–3' for such a small amplitude input are such that the operating point of the composite transistor circuit $S_r$ does not get out of the negative resistance region of its V-I characteristic and are given by the following:

$$K_{r4} = -\frac{1}{1-2R_{\beta 4}/Z_0} \quad K_{t4} = \frac{\frac{2R_{\beta 4}}{Z_0}}{1-\frac{2R_{\beta 4}}{Z_0}}$$

As $R_{\beta 4}$ is selected so that $Z_0/2 > R_{\beta 4}$, $K_{r4} < -1$, and the small amplitude pulse is reflected with amplification changing its polarity.

The value of $K_{r4}$ is so set that self-oscillation between the wave regenerating circuit A and reflecting circuit C will not take place though the reflection gain of the reflecting circuit $S_r$ almost compensates the transmission loss at the delay line B and the reflection loss at terminals 2–2'. Usually, as both losses at the delay line and the terminals 2–2' are made small enough, the value of $K_{r4}$ is equal to approximately $-1$ and consequently the value of $K_{t4}$ is approximately 0. That is to say, the small amplitude pulse shuttling in the delay line B generally seldom gets transmitted through the $S_r$ reflection circuit.

Since $R_{\gamma 4}^{-1} \simeq 0$ as shown in FIG. 6, the reflected pulse by the reflecting circuit $S_r$ for an input pulse of $$\left(\frac{1}{2} - \frac{R_{\beta 4}}{Z}\right) I_{04} Z_0$$

or more gets a constant value of $$-I_{04}\frac{Z_0}{2}$$

not depending on the amplitude of the input wave. This critical value $$\left(\frac{1}{2} - \frac{R_{\beta 4}}{Z}\right) I_{04} Z_0$$

is so set that it is adequately smaller than the amplitude value of the regenerated output pulse by the $N_w$-bistable circuit, so that a greater part of the energy of the regenerated output pulse of the $N_w$-bistable circuit is transmitted through the $S_r$-reflecting circuit and only a part of the energy determined by the staturated reflection level of the $S_r$-reflecting circuit is reflected by the $S_r$-reflecting circuit.

The regenerating repeater system consisting of the above-described circuits operates as follows:

Let $\tau$ represent one way propagation time of the delay line B, and this system regenerates and transmits a pulse train whose fundamental interval T is equal to $4\tau$.

Now we will explain the case where the threshold level of the $N_w$-bistable circuit is so set that the $N_w$-bistable circuit cannot be triggered by the input pulse by itself, but is triggered only when the input pulse and the small amplitude pulse shuttling on the delay line B are applied simultaneously.

An input pulse arriving at terminals 1–1' at a time $t=t_0$ when there exists no pulse on the delay line B does not trigger the $N_w$-bistable circuit but is transmitted to the delay line B, is reflected with amplification changing its polarity at terminals 3–3' because the critical value of the reflecting circuit C, having the reflection characteristics as shown in FIG. 7, is so set that it is larger than the amplitude of the input pulse. This reflected pulse is applied in negative polarity to the $N_w$-bistable circuit from terminals 2—2' at time $t=t_0+2\tau$. Since the resultant impedance of the circuit $N_w$ and the impedance converter is large enough relative to the small amplitude pulse, this negative pulse is reflected in the same polarity, reaches the $S_r$-reflecting circuit, is again reflected with amplification changing its polarity at terminals 3—3', and is applied to the $N_w$-bistable circuit as a pulse of positive polarity at time $t=t_0+4\tau$.

As already mentioned, the reflection gain of the $S_r$-reflecting circuit is restricted to such a value that no self oscillation between the wave regenerating circuit A and the reflecting circuit takes place, so that the amplitude of the pulse applied to the $N_w$-bistable circuit at time $t=t_0+4\tau$ is slightly smaller than that at $t=t_0$. Since the fundamental interval of the input pulse is a $4\tau$, there is possibility of the next input pulse existing at time $t=t_0+4\tau$. If the next input pulse is present, it is added to the said 2-round trip preceding pulse. In case the next input pulse does not exist, no addition is made. The said procedure is repeated in either case. Where the average arrival frequency of the input pulse is given, it is always possible to make a setting such that the amplitude of the shuttling pulse on the delay line B increases by adjusting the reflection gain of the $S_r$-reflecting circuit. For, if the reflection gain of the $S_r$-reflecting circuit is made larger until just before the system oscillates, the shuttling pulse can be caused to increase in amplitude, no matter how small the arrival frequency is. In actuality, an arrival frequency that need not increase the gain so much as to have the system nearly begin oscillating can be expected. When the amplitude of the pulse shuttling on the delay line B has become so large that the sum of it and the input pulse can trigger the $N_w$-bistable circuit, let us call this particular shuttling pulse the timing pulse.

When the ratio of the crest value of the input to the value of the threshold level of the nonlinear negative resistance of the wave regenerating circuit is too small to trigger the nonlinear negative resistance, the input pulse passes through the wave regenerating circuit and is reflected by the reflecting circuit to shuttle between the wave regenerating circuit and the reflecting circuit to become a timing pulse.

The succeeding several input pulses are not regenerated and are consumed to build up the timing pulse until the resultant value of an input pulse and timing pulse exceeds the threshold value of the wave regenerating circuit. Consequently, when the ratio of the value of input signal to the threshold value is small, it is a general practice to send several pilot pulses for the growing of the timing pulse at the beginning of the communication.

If an input pulse arrives after the growth of the timing pulse, the $N_w$-bistable circuit is triggered and switched from the low potential to the high potential state $D_1$ shown in the characteristic curve of FIG. 4, as a positive large amplitude voltage step being generated. This large amplitude positive voltage step is sent out to the line B and to the reflecting circuit C. The reflecting circuit C has a characteristic curve having a critical value as shown in FIG. 6 so that the large positive voltage step is divided in two parts, a smaller portion being reflected by the reflecting circuit C with its polarity changed and the remaining larger portion being passed through the reflecting circuit C. When the time of $2\tau$ passes from the first switching, the $N_w$-bistable circuit is again triggered and switched by the said reflection small amplitude voltage step of negative polarity from the high potential state $D_1$ to low potential state $A_1$ and a negative large amplitude voltage step, having an amplitude equivalent to one of the large positive voltage steps, is generated by the $N_w$ bistable circuit. The preceding large positive step and the large negative voltage step following behind by $2\tau$ compose a positive pulse having a width $2\tau$ and a large amplitude which is sent out from terminals 4–4' via the delay line and reflecting circuit (the large negative pulse increases the fall length of the trailing edge of the positive pulse to provide in effect a large positive pulse.) A part of the energy is reflected by the $S_r$-reflecting circuit with its polarity changed. A new timing pulse is produced by this small amplitude reflection step of positive polarity and continues shuttling between the wave regenerating circuit A and the reflecting circuit C gradually attenuating its amplitude until the arrival of the next input pulse.

Consequentially, in the regenerating repeater system of FIG. 2, the input pulse train is wave-regenerated and re- timed into the output pulse train having width $2\tau$ and fundamental interval $4\tau$.

FIG. 8 shows an outline of the operation of the circuit. In that Figure, I is the input wave form observed at terminals 1–1' of FIG. 2, II is the voltage wave form of $N_w$ observed at the 2 terminals $t_1-t_1'$ of the composite transistor circuit $N_w$ of FIG. 2, and III is the output wave form observed at terminals 4–4'.

The figure shows a case where a pulse train of pattern 10011 is sent out from the pulse source 8, transmitted on the transmission line $L_1$ and applied to the input terminals 1–1' as an input pulse train, $P_1$, $P_1'$ and $P_1''$ attenuated and having phase jitters, while the small amplitude timing pulses II having the duration $2\tau$ are formed already in the delay line B.

When the input pulse $P_1$ and a timing pulse are applied to the $N_w$-bistable circuit at a time $t=t_0$ simultaneously, the resultant wave form formed by these two pulses exceeds the threshold level of the $N_w$-bistable circuit at the time $t=t_0$ because the timing pulse has a steep leading edge, and thus triggers the $N_w$-bistable circuit and generates a large amplitude positive voltage step.

This large amplitude positive voltage step is transmitted on the line B and arrives at terminals 3–3' of the reflecting circuit C at a time $t=t_0+\tau$. When the large amplitude positive step arrives at the reflecting circuit C which has a characteristic curve having a critical value as shown in FIG. 6, a large part of the voltage step exceeding the critical value and passes through the reflecting circuit but the remainder is reflected towards the $N_w$-bistable circuit with the opposite polarity and triggers again the $N_w$-bistable circuit and generates a negative voltage step as large as the aforementioned positive voltage step at a time $t=t_0+2\tau$.

The large negative voltage step discontinues the large positive pulse at $t=t_0+2\tau$ to give a resultant positive pulse of duration $2\tau$ and of twice the magnitude of either large pulse alone as the fall of the positive pulse is doubled due to the addition of the negative rise. A small portion of this pulse is, of course, reflected by circuit C. This large portion not reflected is the regeneration pulse of input pulse $P_1$. Input pulses $P_1'$ and $P_1''$ are regenerated in the same manner.

However, if a positive timing pulse is only applied to the $N_w$-bistable circuit and an input pulse is not present at the time $t=t_0+4\tau$, this timing pulse is reflected at terminals 2–2' with the same polarity and low loss because the terminating impedance of terminals 2–2' is very large for a small amplitude pulse, and propagates on the delay line B, arrives at the reflecting circuit C and is reflected there with amplification toward terminals 2–2' with opposite polarity and sufficient amplification to compensate the reflection loss of the wave regenerating circuit and the transmission loss of the delay line B. The timing pulse arriving at terminal 2–2' is reflected in the same manner mentioned before, propagates again on the delay line B, arrives at the reflection circuit C, is reflected at the reflecting circuit C with opposite polarity and propagates on the delay line B towards terminals 2–2' and again arrives at terminals 2–2' at the time $t=t_0+8\tau$.

In such a way, a timing pulse having the duration of $2\tau$ shuttles between the wave regenerating circuit and the reflecting circuit C with the fundamental period of $4\tau$ and the attenuation of the amplitude of the timing pulse is compensated by the amplification of the reflecting circuit C. The timing pulse continues shuttling until a following input pulse arrives.

The above explanation of the operation has been made concerning a case where the input pulse by itself cannot trigger the $N_w$-bistable circuit.

However, when we design to make the ratio of the value of the input pulse applied at terminals 1–1' to the threshold value of the $N_w$-bistable circuit large, input pulses are immediately regenerated, but the accuracy of the retiming of the regenerated pulses are poor until the timing pulses are formed steadily. If the leading edge of the input pulse is extremely steep, the $N_w$-bistable circuit is triggered by the contribution of the input pulse alone so that the timing pulse is not effective for the retiming of the regeneration pulse.

Since the wave form of the input pulse attenuated on the transmission line has generally a slanted rise at the leading part of the input pulse wave form and the timing pulse has a step rise at its leading part, the retiming moment is determined by the leading part of the timing pulse.

As stated above, the present invention makes it possible to effect more stable retiming in a simple manner, using the pulse propagation time on the line of a fixed length as a basis for retiming without using the ordinary LC resonating circuit.

FIG. 9 shows another embodiment. A composite transistor circuit $N_w$ is operated as a monostable circuit, and an N-type negative resistance circuit $N_r$ connected in series to the line is used as the nonlinear active reflecting circuit $C_{201}$–$C_{208}$ are coupling condensers or bypass condensers and have impedance small enough for signals. $L_{203}$ is a coil for the purpose of the monostable operation of the composite transistor circuit $N_w$ and the value of its inductance is set so as to make the width of the output pulse by monostable operation have a prescribed value. With the exception of the coil $L_{203}$, the wave regenerating circuit A is quite similar to that of the embodiment shown in FIG. 2. In FIG. 4, the D-C load line and A-C load line of the circuit $N_w$ are shown by straight line $a_1$–$a_1'$ and straight line $b_1$–$b_1'$ respectively.

In the $N_w$-monostable circuit, the value of inductance of the coil $L_{203}$ is not made so great as that of $L_{103}$ in the $N_w$-bistable circuit, but is so set that the transition from high potential state $D_1$ to bottom point $E_1$ quickly takes place in a time shorter than the fundamental repetition interval of the signal pulse train.

That is to say, the composite transistor circuit of FIG. 9 performs such a monostable operation that it is triggered by one positive input pulse and is switched to a high potential state and, after the elapse of a fixed length of time W determined by coil $L_{203}$, jumps itself to a low potential state. Block C is a composite transistor circuit $N_r$ with an N-type negative resistance being connected in series to the line and stably biased in its negative resistance region. The composite transistor circuit $N_r$ is a circuit as shown in FIG. 10(a) and is represented by a symbol as shown in FIG. 10(b). In FIG. 10(a), $t_3$, $t_3'$ and $P_3$ are terminals, $T_{35}$ and $T_{36}$ are transistors, $R_{31}$, $R_{32}$ and $R_{33}$ are resistors, $E_{39}$ is a constant voltage power source, $D_{37}$ is a diode. V shows a voltage applied between terminals $t_3$ and $t_3'$, and is defined to take positive value wherein a potential at $t_3$ is higher than that at terminal $t_3'$. I shows a current which flows into terminal $t_3$ and flows out from terminal $t_3'$. The voltage-current characteristic of this circuit between terminals $t_3$–$t_3'$ shows such a negative resistance of an N-type as shown in FIG. 11. In FIG. 11, there are two positive resistance regions which are separated by a negative resistance region. The one at the smaller voltage side of the negative resistance region is called first positive resistance region, the other is called second positive resistance region.

The various characteristic values of the V-I characteristic curve are as follows:

—$V_{P3}$: a voltage of the transition point between the negative resistance region and the first positive resistance region
—$V_{V3}$: a voltage of the turning point in the negative resistance region
$V_{V3}$: a voltage of the transition point between the negative resistance region and the second positive resistance region $R_{a3}^{-1}$: a gradient in conductance of the V-I curve in the first positive resistance region
—$R_{\beta 3}^{-1}$: a gradient in conductance of the V-I curve in the negative resistance region
$R_{\gamma 3}^{-1}$: a gradient in conductance of the V-I curve in the second positive resistance region These values are given in the following formulae using circuit constants shown in FIG. 10(a):

$$-V_{P3} \simeq -\frac{R_{31}}{R_{31}+R_{32}} E_{39}$$

$$V_{V3} \simeq -\left(V d_{35} + \frac{R_{31}}{R_{32}} V d_{36}\right)$$

$$V_{V3} \simeq V d_{37}$$

$$R_{a3}^{-1} \simeq \frac{1}{R_{31}} + \frac{1}{R_{32}} + \frac{1}{R_{33}}$$

$$-R_{\beta 3}^{-1} \simeq \frac{R_{32}}{R_{31} \cdot R_{33}}$$

$$R_{\gamma 3}^{-1} \simeq \frac{1}{V_{f37}}$$

Where, $V_{d35}$ and $V_{d36}$ are the emitter diffusion potentials of transistors $T_{35}$ and $T_{36}$ respectively, $V_{d37}$ is the diffusion potential of diode $D_{37}$, and $V_{f37}$ is the forward resistance of diode $D_{37}$. The composite transistor circuit $N_r$ is biased at Point $A_3$ with constant voltage diode $D_{201}$; resistances $R_{205}$, $R_{204}$; coils $L_{205}$, $L_{206}$, $L_{207}$. The straight line $a_3$–$a_3'$ is the D-C load line. The straight line $b_3$–$b_3'$ is the A-C load line, and its gradient is $$-\frac{1}{2Z_0}$$

The reflection characteristic and transmission characteristic at terminals 3–3' are shown in FIG. 12. The graph of FIG. 12 is a graph obtained by approximation on the assumption that in FIG. 11 negative resistance $-R_{\beta 3}$ is shown also in the voltage range $-V_{V3}/<V<V_{V3}$.

Reflection coefficient $K_{r3}$ and transmission coefficient $K_{t3}$ at terminals 3–3' for such a small amplitude input that the operating point of the composite transistor $N_r$ may not get out of the negative resistance region of its V-I characteristic may be given by the following formulae:

$$K_{r3} = \frac{1}{1 - 2\frac{Z_0}{R_{\beta 3}}}, \quad K_{t3} = \frac{2\frac{Z_0}{R_{\beta 3}}}{1 - 2\frac{Z_0}{R_{\beta 3}}}$$

Since $R_{\beta 3}$ is so selected that $2Z_0 < R_{\beta 3}$, $1 < K_{r3}$, the small amplitude pulse is reffected with amplification without changing its polarity by the $N_r$-reflecting circuit.

The value of $K_{r3}$ is so set that no self-excited oscillation takes place between the wave regenerating circuit A and the reflecting circuit C, although the transmission loss at the delay line B and the reflection loss at terminals 2–2' are almost all compensated by the reflection gain of the $N_r$-reflecting circuit. As losses at the delay line B and terminals 2–2' can usually be made sufficiently small, the value of $K_{r3}$ is equal to approximately +1 and consequently the value of $K_{t3}$ is approximately 0. That is to say, usually the small amplitude pulse shuttling on the delay line B is scarcely transmitted through the $N_r$ reflecting circuit. As shown in FIG. 11, $$R_{r3}^{-1} \simeq \frac{1}{V_{f37}}$$

and generally $V_{f37} \ll Z_0$, so that it may be considered that $$R_{\gamma 3}^{-1} \gg \frac{1}{Z_0}$$

Consequently, as shown in FIG. 12, the reflection wave of the $N_r$-reflecting circuit has a constant value of $$\frac{V_{03}+V_{v3}}{2}$$

as against any input wave not less than $$\left(\frac{1}{2}-\frac{Z_0}{R_{\beta 3}}\right)\times(V_{03}+V_{v3})$$

independent of the amplitude of the input wave.

This critical value $$\frac{V_{03}+V_{v3}}{2}$$

is so set that it is adequately smaller than the value of amplitude of regenerated output wave of the $N_w$-monostable circuit and a greater part of the energy of the regenerated output pulse of the $N_w$-monostable circuit is transmitted through the $N_r$-reflecting circuit, only a part of the energy determined by the saturated reflection level of the $N_r$-reflecting circuit being reflected by the $N_r$-reflecting circuit.

The pulse regenerating system of FIG. 9 which comprises the above-described circuits operates as follows: In this case, twice the time of the one-way propagation on the delay line B is made equal to the fundamental repetition interval of the input pulse train. In the system of FIG. 9, both terminals of the delay line B are so terminated that the small amplitude pulse is reflected without changing its polarity, so that the one cycle of the shuttling on the delay line B is equal to $2\tau$. In case a pulse train having a fundamental interval of $2\tau$ and an amplitude smaller than the threshold level of the $N_w$-monostable circuit arrives, it is always possible to adjust the reflection gain of the $N_r$-reflecting circuit and make setting such that the timing pulse is produced on the delay line B without allowing the system to oscillate. If an input pulse arrives after the production of a timing pulse, the $N_w$-monostable circuit is triggered and generates a regenerated pulse having a width W. In this situation, the output pulse width is determined by the $N_w$-monostable circuit alone, having nothing to do with $\tau$. A part of the energy of the regenerated pulse generated by the $N_w$-monostable circuit is reflected by the $N_r$-reflecting circuit and becomes a new timing pulse, and continues shuttling again between the wave regenerating circuit A and the reflecting circuit C, with its amplitude gradually diminishing, until the next input pulse arrives.

FIG. 13 shows an outline of the operation of the pulse regenerating system of FIG. 9. I in FIG. 13 shows the input wave form observed at terminals $t_1$–$t_1'$ of the $N_w$-monostable circuit, II is the wave form observed at terminals 2–2' and III is the output wave form observed at terminals 4–4'.

FIG. 13 shows a case where the timing pulse has been permitted to grow in the pulse regenerating system.

When the input pulse $P_1$ and any timing pulse are applied to the $N_w$-monostable circuit at a time $t=t_0$ simultaneously, the resultant wave form formed by the two pulses exceeds the threshold level of the $N_w$-monostable circuit at the time $t=t_0$ and triggers the $N_w$-monostable circuit, because the timing pulse has a steep edge at its leading part when the time is $t=t_0$, and generates a large amplitude positive voltage pulse having a width W as a regeneration pulse of input pulse $P_1$.

This large voltage step is transmitted on the line B and applied at terminals $t_3$–$t_3'$ of the $N_r$-reflecting circuit having a V-I characteristic curve as shown in FIG. 11, at a time $t=t_0+\tau$. When the large amplitude positive pulse arrives at the $N_r$-reflecting circuit, a large part of the regenerated pulse exceeding the critical value of the reflecting circuit passes over or through this circuit, and another part of the regenerated pulse is reflected towards the $N_w$-monostable circuit with the same polarity and with an appropriate amplification and arrives at terminal 2–2' as a timing pulse.

When this timing pulse is applied to the $N_w$-monostable circuit and an input is not simultaneously present, the timing pulse is reflected with same polarity with low reflection loss.

Consequently, the timing pulse shuttles between the $N_w$-monostable circuit and the reflecting circuit with the fundamental period of $2\tau$.

The input pulses $P_1'$ and $P_1''$ are regenerated in the same manner and sent out from the terminals 4–4' as output pulses $P_2$, $P_2'$ and $P_2''$, as shown in III of FIG. 13, with the width W and delayed by $\tau$ from the original pulses.

In this case, it must be noted that when the $N_w$-monostable circuit operates, it has a transient period to recover the stable state. It is shown in III of FIG. 13 in that the trailing part of the regenerated pulse recovers gradually to a steady state. In accordance with this, the circuit configuration should be made such that the sum of recovery time and output pulse width W is smaller than the fundamental period $2\tau$.

By the configuration shown in FIG. 9, the input pulse train is wave-regenerated and retimed into the output pulse train having width W and fundamental interval $2\tau$. As shown in FIG. 13, the timing pulse is scarcely transmitted to the output side also in this case. Like the configuration shown in FIG. 2, the configuration shown in FIG. 9 also operates stably as against an input pulse having a crest value greater than the threshold level of the $N_w$-monostable circuit.

FIG. 14 shows another embodiment. It is of such a construction that the $N_w$-bistable circuit of FIG. 2 is used by being connected in series to the line. $L_{300}$–$L_{306}$ are choke coils which have impedance great enough for signals. $C_{301}$–$C_{310}$ are coupling condensers or bypass condensers which have impedance small enough for signals. The wave regenerating circuit A consists of an impedance converter which is the emitter grounded circuit of transistor $T_{300}$ and the aforementioned $N_w$-bistable circuit. By regulating resistances $R_{300}$, $R_{301}$ and $R_{302}$, the proper setting is made so that the input impedance of the impedance converter is equal to the impedance $Z_0$ of the line and that its output impedance is adequately smaller than $Z_0$.

The composite transistor circuit $N_w$ is biased at Point $A_1$ of FIG. 4 with the gradient of the straight line $a_1$–$a_1'$ by constant voltage diode $D_{300}$, resistances $R_{300}$, $R_{304}$, and coil $L_{302}$. The straight line $b_1$–$b_1'$ of FIG. 4 is the A-C load line, but its gradient may also be considered to be $$-\frac{1}{Z_0}$$

if the output impedance of the impedance converter is ignored in this case. That is to say, the $N_w$-bistable circuit of FIG. 14 is under the same conditions as that of FIG. 2 with respect to both D-C and A-C, and has the same function.

The nonlinear active reflecting circuit C is the composite transistor circuit $S_r'$ with an S-type negative resistance being connected in series to the line by condensers $C_{307}$ and $C_{310}$ and stably biased in its negative resistance region. The composite transistor circuit $S_r'$ is a variation made from the composite transistor circuit $S_r$ shown in FIG. 5(a) by replacing $PNPTrT_{46}$ and $NPNTrT_{45}$ and reversing the polarity of the electric source $E_{49}$. Its V-I characteristic can be obtained by changing the sign for the V-axis and I-axis of FIG. 6. The composite transistor circuit $S_r'$ is biased in opposite polarity to the bias of the composite transistor circuit $S_r$ shown in FIG. 2 by constant voltage diode $D_{302}$; resistances $R_{305}$, $R_{306}$; and coil $L_{305}$. The reflection characteristic and transmission characteristic of the $S_r'$-reflecting circuit at terminals 3–3' are naturally in opposite polarity to those of the $S_r$-reflecting circuit shown in FIG. 7. The small amplitude input pulse is reflected with amplification changing polarity, while the circuit has such a saturated reflection characteristic that the amplitude of the reflected pulse of the negative large amplitude pulse is saturated at a positive, small constant value.

The function of the pulse regenerating system shown in FIG. 14 which comprises the above-described circuits is as follows: Let $\tau$ represent the one-way propagation time of the delay line B, and a pulse train having a fundamental interval T equal to $4\tau$ is to be regenerated. The following explanation is made with reference to FIG. 15. I is the input wave form observed at terminals 1–1'. II is the voltage wave form of the $N_w$-bistable circuit observed between terminals $t_1$—$t_1$. III is the output wave form observed at terminal 4–4'. Here, as to the polarity of the terminal voltage of the composite transistor circuit, it is considered positive when potential at $t_1$ is higher than that at $t_1'$ as defined in FIG. 3(a). In the construction of FIG. 14, the amplitude of the input pulse must always be greater than the threshold level of the $N_w$-bistable circuit. If a positive input pulse arrives at time $t=t_0$, the $N_w$-bistable circuit is triggered and switched to a high potential state, generating a positive large amplitude positive voltage step between terminals $t$, and $t'$. Since terminal $t_1'$ is connected to terminal 2 and terminal $t_1$ to terminal 2' via $C_{303}$, the output impedance of the impedance converter and $C_{302}$ respectively, the large positive voltage step generated at the $N_w$-bistable circuit is applied to terminals 2–2' as a large negative voltage step due to the circuit configuration and it propagates on the line B. A greater part of its energy is sent out to the next stage through terminals 4–4' without being reflected by the $S_r'$-reflecting circuit. A part of the energy is reflected by the $S_r'$-reflecting circuit with a change in polarity and thereby becomes a positive small step, reaching terminals 2–2' at a time interval of $2\tau$ after the initial switching, and is applied between terminals $t_1$–$t_1'$ in negative polarity to switch the $N_w$-bistable circuit from the high potential state $D_1$ which is shown in FIG. 4 to a low potential state $F_1$ of the same figure. By this switching action a large negative amplitude voltage step is generated in the $N_w$-bistable circuit and this large negative voltage step is applied to terminals 2–2' as a positive voltage step having an amplitude as large as the preceding large negative voltage step due to the circuit configuration and this positive voltage step cancels the trailing part of the preceding negative voltage step after the time $2\tau$ to make a pulse having a duration $2\tau$. This negative pulse is a regeneration pulse of input pulse $P_1$. Input pulses $P_1'$ and $P_1''$ are regenerated in the same manner owing to it. A greater part of its energy is transmitted through the $S_r'$-reflecting circuit, while a part of it has its polarity reversed and is reflected, a small negative step therefore reaches terminals 2–2' after time $4\tau$ passes from the time of initial switching. A timing pulse is produced from this small negative step and continues shuttling, with its amplitude gradually decreasing, until the next input pulse arrives. After $4n\tau$ ($n$:integers) from the initial switching, a negative small step which is the front edge of timing pulse arrives at terminals 2–2' from the delay line B and this is applied in positive polarity between terminals $t_1$–$t_1'$ and controls the operating time of the $N_w$-bistable circuit. As shown in FIG. 15, this construction makes the output of negative polarity. In case repeating is to be continued for many times, it is permissible if the repeater systems of the configuration of FIG. 14, and the repeater systems which are given by changing the configuration of FIG. 14 to one in opposite polarity having the function to regenerate negative input pulses into positive output pulses are placed alternately.

The change to opposite polarity may be effected in the following way: The impedance converter consisting of transistor $T_{300}$ may be as it is. The $N_w$-bistable circuit can have its polarity readily reversed by replacing the PNP transistor and NPN transistor, reversing the polarity of the electric source between terminals $t_1$, $t_1'$ and making some change in the bias circuit, just as done to change the $S_r$-reflecting circuit to the $S_r'$-reflecting circuit. As reflecting circuit C, $S_r$-reflecting circuit may be used again just as in the case of FIG. 2.

FIG. 15 shows a wave obtainable when there are no fluctuations of input on the time axis and the timing pulse has an ideal steepness. Even where there are input fluctuations on the time axis, however, the operation is stable enough as explained with respect to the configuration shown in FIG. 2, since the rising time of the timing pulse is not zero in actuality.

Just as the construction of FIG. 9 using the $N_w$-monostable circuit was obtained from the construction of FIG. 2 using the $N_w$-bistable circuit by altering the inductance value of coil $L_{103}$, it is possible to use a construction in which the $N_w$-monostable circuit is connected in series to the line as a variation of the construction of FIG. 14. That construction is shown in FIG. 16. The wave regenerating circuit A of FIG. 16 is quite the same as the wave regenerating circuit A of FIG. 14 and has an output pulse width W, except that the value of inductance of $L_{402}$ is by far smaller than that of $L_{302}$ and the composite transistor circuit is made to operate monostably. The bias condition of the composite transistor circuit $N_w$ and the manner of its monostable operation are the same as those of the $N_w$-monostable circuit of FIG. 9. Just as in the case of the construction of FIG. 14, the output of the wave regenerating circuit A is of negative polarity also in the case of the construction of FIG. 16, so that the nonlinear active reflecting circuit C must be such that it has a saturated reflection characteristic as against a negative large amplitude input. This can be realized if a circuit made by converting the $N_r$-reflecting circuit of the construction of FIG. 9 into opposite polarity is used. The composite transistor circuit $N_r'$ is a variation of the composite transistor circuit $N_r$ shown in FIG. 11 made by replacing PNP transistor $T_{35}$ and NPN transistor $T_{36}$, reversing the polarity of the electric source $E_{37}$ and reversing the direction of diode $D_{37}$. This is biased in opposed polarity to the bias of FIG. 9 by constant voltage diode $D_{401}$; resistances $R_{405}$, $R_{406}$; and coils $L_{405}$, $L_{406}$. The reflection characteristic and transmission characteristic of the $N_r'$-reflecting circuit at terminals 3–3' are naturally in opposed polarity to those of the $N_r$-reflecting circuit shown in FIG. 12. It reflects a small amplitude pulse with amplification without changing polarity, and has a saturated reflection characteristic as against a negative large amplitude pulse of saturation at a negative, fixed small level. The operation of the pulse regenerating system of the construction of FIG. 16 is shown in FIG. 17. I of that figure is the input wave form observed at terminals 1–1', II is the voltage wave form of the $N_w$-monostable circuit observed at terminals $t_1$–$t_1'$, and III is the output wave form observed at terminals 4–4'.

FIG. 17 shows a situation where the timing has grown in the pulse regenerating system.

When the input pulse $P_1$ and any timing pulse are applied to the $N_w$-monostable circuit at a time $t=t_0$ simultaneously, the resultant waveform formed by these two pulses exceeds the threshold level of the $N_w$-monostable circuit at the time $t=t_0$ and triggers the $N_w$-monostable circuit because the timing pulse has a steep rise occurring at time $t=t_0$ and generates a large amplitude positive pulse having a width W as a regeneration pulse of input pulse $P_1$. This regeneration pulse appearing between terminals $t_1$–$t_1'$ is applied to terminals 2–2' via capacitor $C_{403}$, the output impedance of the impedance converter and capacitor $C_{402}$ and via another path by capacitor $C_{406}$ as a large negative pulse. This large negative pulse propagates on the line B and arrives at terminals 3–3' of the reflecting circuit having a saturation characteristic and an amplification reflection at a time $t=t_0+\tau$. When the large negative pulse arrives at the $N_r$-reflection circuit, a large part of this pulse exceeding the critical value of the reflecting circuit passes through this circuit and another part of the pulse is reflected towards the $N_w$-monostable circuit with the same polarity and with an appropriate amplification and arrives at terminals 2–2' as a timing pulse at a time $t=t_0+2\tau$.

When this timing pulse is applied to the $N_w$-monostable circuit and an input pulse does not exist simultaneously, the timing pulse is reflected with same polarity with low reflection loss.

Consequently, the timing pulse shuttles between the $N_w$-monostable circuit and the reflecting circuit with the fundamental period $2\tau$.

The input pulses $P_1'$ and $P_1''$ are regenerated in the same manner and sent out from the terminals 4–4' as the output pulses $P_2$, $P_2'$ and $P_2''$ of negative polarity having the width W and delayed by $\tau$ from the input pulses as shown in III of FIG. 17.

In the instance of the circuit configuration of FIG. 16, it should be taken into account that the sum of recovery time and output pulse width W is smaller than the fundamental period $2\tau$.

In all of the aforementioned embodiments shown in FIG. 2, FIG. 9, FIG. 14 and FIG. 16, a pulse regenerating circuit of negative resistance of N-type is used as the wave regenerating circuit. From the theory of duality, however, it is readily conceivable that a construction using a pulse regenerating circuit of negative resistance of the S-type as a wave regenerating circuit is also possible. Four embodiments are shown in FIG. 18, FIG. 19, FIG. 20 and FIG. 21, and these are in dual relation to the embodiments shown in FIG. 2, FIG. 9, FIG. 14 and FIG. 16 respectively. The composite transistor circuit $S_w$ used in the constructions of FIGS. 18–21 is a circuit of the construction shown in FIG. 22($a$) and is represented by the symbol shown in FIG. 22($b$). In FIG. 22($a$), $t_2$, $t_2'$ and $P_2$ are terminals, $T_{25}$ and $T_{26}$ are transistors, $R_{21}$, $R_{22}$ and $R_{23}$ are resistors, $E_{29}$ is a constant voltage power source. V shows a voltage applied between terminals $t_2$ and $t_2'$, and is defined to take positive value wherein a potential at terminal $t_2$ is higher than that at terminal $t_2'$. I shows a current which flows into terminal $t_2$ and flows out from terminal $t_2'$. The V-I characteristic between the terminals $t_2$–$t_2'$ of this circuit shows an S-type negative resistance as shown in FIG. 23. In FIG. 23, there are two positive resistance regions which are separated by a negative resistance region. The one at the smaller current side of the negative resistance region is called the first positive resistance region, and the other is called the second positive resistance region.

The various values defining the V-I characteristic curve are as follows:

$V_{P2}$: a voltage of the transition point between the negative resistance region and the first positive resistance region
$I_{P2}$: a current of the transition point between the negative resistance region and the first positive resistance region
$I_{V2}$: a current of the transition point between the negative resistance region and the second positive resistance region
$R_{a2}^{-1}$: a gradient in conductance of the V-I curve in the first positive resistance region
$-R_{\beta2}^{-1}$: a gradient in conductance of the V-I curve in the negative resistance region
$R_{\gamma2}^{-1}$: a gradient in conductance of the V-I curve in the second positive resistance region These values are given in the following formulae using circuit constants shown in FIG. 22($a$):

$$V_{P2} \simeq V_{d25}$$

$$I_{P2} \simeq nV_{d27} \cdot \frac{R_{24}+nV_{f27}}{R_{24} \cdot nV_{f27}}$$

$$I_{V2} \simeq \frac{R_{22}}{R_{23}(R_{21}+R_{22})} E_{29}$$

$$R_{a2}^{-1} \simeq \infty$$

$$-R_{\beta2}^{-1} \simeq -\frac{1}{\dfrac{R_{21} \cdot R_{23}}{R_{22}} - \dfrac{R_{24}nV_{f27}}{R_{24}+nV_{f27}}}$$

$$-R_{\gamma}^{-1} \simeq \frac{1}{\left(\dfrac{1}{R_{21}}+\dfrac{1}{R_{22}}+\dfrac{1}{R_{23}}\right)^{-1}+\dfrac{R_{24} \cdot nV_{f27}}{R_{24}+nV_{f27}}}$$

Where, $V_{d25}$ is the emitter diffusion potential of transistor $T_{25}$, $V_{d27}$ is the diffusion potential of diode $D_{27}$, $V_{f27}$ is the forward resistance of diode $D_{27}$ and $n$ is the number of diode $D_{27}$. A feature of this V-I characteristic is that impedance is very low in the positive resistance region on the small current side of the negative resistance region.

The pulse regenerating operations of the pulse regenerating systems of the configurations shown in FIGS. 18–21 are quite the same as those of the configurations using composite transistor circuits $N_w$ in dual relation. Here we will explain the operation of the system of FIG. 18 for example in comparison with that of FIG. 2.

The wave regenerating circuit A comprises an impedance converter using transistor $T_{500}$ in the common emitter configuration and an $S_w$-bistable circuit of the bistably biased composite transistor circuit $S_w$ connected in series to the line. The impedance converter is the same as that in the configurations of FIG. 14 and FIG. 16. Its input impedance is equal to the impedance $Z_0$ of the line, and the output impedance is adequately smaller than $Z_0$. The composite transistor circuit $S_w$ is biased at Point $A_2$ in FIG. 22 by a constant voltage diode $D_{500}$ and resistance $R_{503}$. The straight line $a_2$–$a_2'$ is the D-C load line and its gradient is $-R_{503}^{-1}$. The value of $R_{503}$ is adequately larger than $Z_0$, and is consequently considered open for signals. The straight line $b_2$–$b_2'$ is the A-C load line and, if the output impedance of the $T_{500}$-impedance converter is ignored, its gradient is $$-\frac{1}{Z_0}$$

The impedance of the A circuit at terminals 2–2' as viewed from the side of the delay line B, is given a value such that an incident wave reflects with little loss. Generally, it is maintained in an open condition for the N-type negative resistance composite transistor circuit, such as found in the circuits of FIGS. 2, 9, 14 and 16, and in a shorted condition for the S-type negative resistance circuit now being discussed in connection with FIGS. 18–21.

As defined in FIG. 22($a$), the current that flows in from terminal $t_2$ and flows out from terminal $t_2'$ is considered to be the current in the positive direction. Since $R\alpha_2^{-1} \simeq \infty$ in FIG. 23, the circuit $S_w$ has low impedance as against a small amplitude pulse which does not exceed the threshold level $I_{P2}$–$I_{O2}$ in the proximity of Point $A_2$. If a positive input exceeding the threshold level is applied between terminals $t_2$, $t_2'$, the circuit $S_w$ is triggered and switched to the large current state $D_2$ via Points $B_2$, $C_2$, generating a positive large amplitude current step. Point $D_2$ is not a direct-current-wide stable point, and the operating point of the circuit $S_w$ gradually shifts from Point $D_2$ to Point $E_2$ in accordance with a very large time constant which is determined mainly by $C_{505}$, but it can be considered approximately a stable point in relation to such a short time as the repetition interval of the pulse signals.

When a negative input so large that the operating point exceeds Point $E_2$ is applied to the composite transistor circuit $S_w$ located at Point $D_2$, the circuit $S_w$ is again triggered and switched to $A_2$ via Points $E_2$, $F_2$, generating a negative large amplitude current step. That is to say, the circuit $S_w$ of FIG. 18 operates bistably. The nonlinear active reflecting circuit C is the $N_r$-reflecting circuit used in the construction of FIG. 9.

Figures 18, 19:
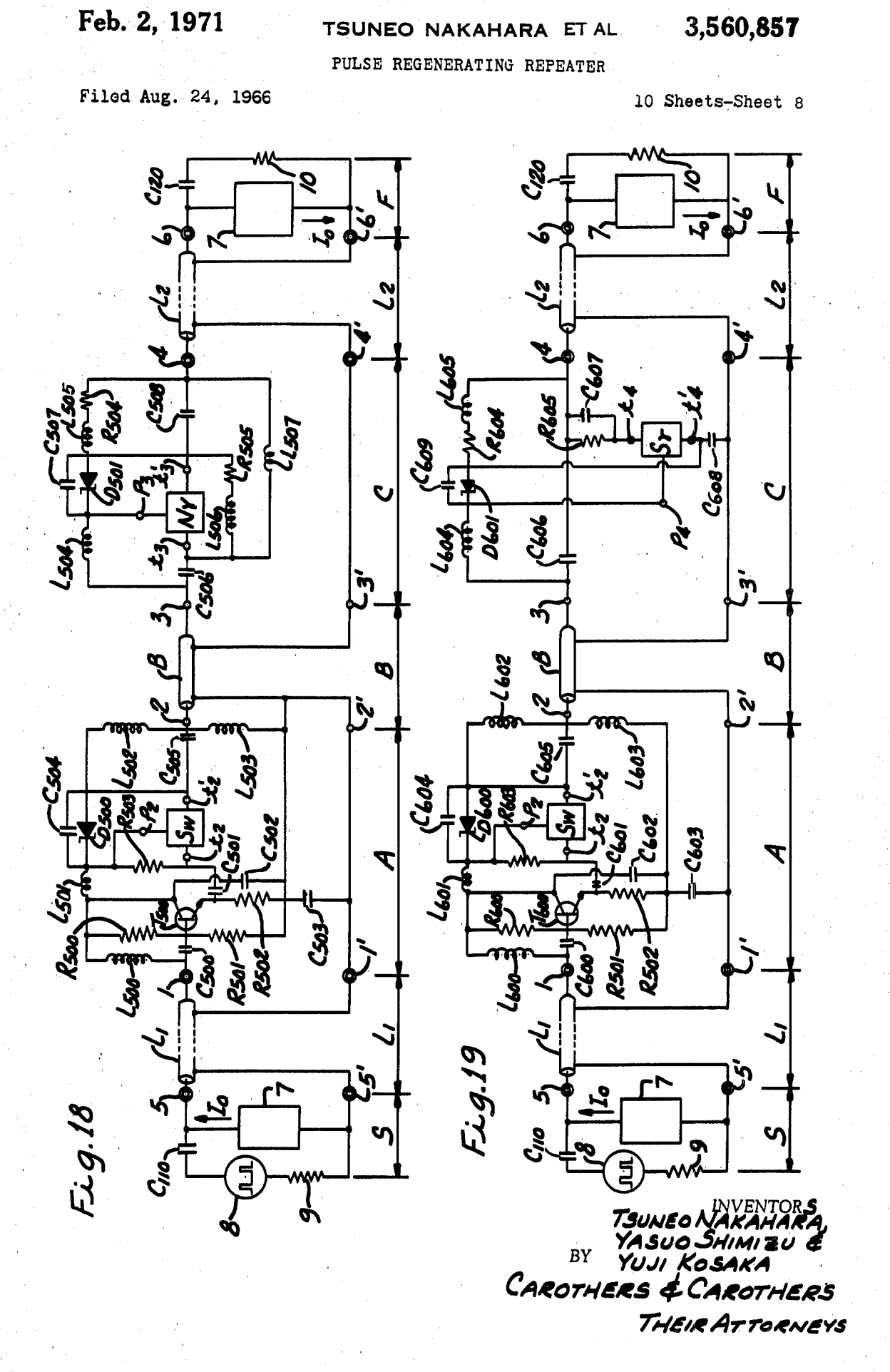

In the construction of FIG. 18, the small amplitude pulse shuttling on the wave delay line B is reflected in reversed polarity with low loss at terminals 2-2' and is reflected with amplification without changing polarity at terminals 3-3'. Like the construction of FIG. 2, the construction of FIG. 18 regenerates a pulse train which has a fundamental interval equal to four times the one way transmission time $\tau$ of the delay line B. In this configuration, because of the aforementioned terminal conditions, a positive small amplitude step arrives from the delay line B at terminals 2-2' after a half cycle ($=2\tau$) passes from the time the $S_w$-bistable circuit is switched from the small current state $A_2$ to the large current state $D_2$, and a negative small amplitude step after one cycle ($=4\tau$) passes, their polarity being opposite to that shown in FIG. 2. In FIG. 18, however, the terminal $t_2'$ of the circuit $S_w$ is connected to the terminal 2 by coupling condenser $C_{505}$, and the terminal $t_2$ to the terminal 2' via coupling condenser $C_{502}$, $T_{500}$-impedance converter's output impedance and coupling condenser $C_{502}$, so that the aforementioned small step after the elapse of a half-cycle is applied between terminals $t_2$–$t_2'$ as a negative electromotive force and switches the $S_w$-bistable circuit from large current state to small current state, while the aforementioned negative small step after the elapse of one cycle is applied between terminals $t_2$–$t_2'$ as positive electromotive force and increases the sensitivity of the $S_w$-bistable circuit, controlling the operating time of the $S_w$-bistable circuit if the next input pulse arrives at that point of time. That is to say, it operates in the same way as the constitution of FIG. 2.

FIG. 8, which shows the operation of the pulse regenerating system of the configuration of FIG. 2, may be considered to show the operation of the pulse regenerating system of FIG. 18 if II of that figure is considered to represent the time waveform of the current which flows from terminal $t_2$ to terminal $t_2'$ of the composite transistor circuit $S_w$. This is also applicable to the other three configurations. If the graph II of FIG. 13, FIG. 15, and FIG. 17 is considered to be the time waveform of the current which flows from terminal $t_2$ to terminal $t_2'$ of the composite transistor circuit $S_w$, they show the operation of the pulse regenerating systems of the configuration of FIG. 19, FIG. 20, and FIG. 21 respectively. In FIG. 20 and FIG. 21, the composite transistor circuit $S_w$ operates as a monostable regenerating circuit. That is to say, $C_{703}$ of FIG. 20 and $C_{802}$ of FIG. 21 are sufficiently small as compared with $C_{505}$ of FIG. 18 and $C_{605}$ of FIG. 19, so that in FIG. 23 the large current state $D_2$ can no longer be considered to be the approximate stable point and the state of the composite transistor $S_w$ after switching to the large current state quickly shifts from Point $D_2$ towards Point $E_2$. $C_{703}$ and $C_{802}$ are both so set that the output pulse width of the $S_w$-monostable circuit is W.

For convenience's sake, a composite transistor negative resistance circuit was used in the eight examples of embodiment that have been explained. This invention, however, is not limited to them. In the present invention, two negative resistance devices are used, one in the wave regenerating circuit and one in the nonlinear active reflecting circuit. The former, biased in the positive resistance region on one side, performs switching operation between it and the positive resistance region on the other hand with a negative resistance region in-between, while the latter, biased in the negative resistance region, operates as a nonlinear resistance element. Consequently, as the active element of the nonlinear active reflecting circuit, a negative resistance device capable of being stably biased in its negative region is desirable. As an N-type negative resistance device, there is the Esaki diode for example and this is capable of stable bias in the negative resistance region and can therefore be employed as the active device of any of the aforementioned circuits. As an S-type negative resistance device, there is the PIN diode for example. As this cannot be biased in a negative region stably, it can be used only as the operating device of a wave regenerating circuit. At the present moment no S-type negative resistance device which can be stably biased in its negative region has yet been developed, but, when such a negative resistance device is developed in the future, it is quite natural that it will be possible to use it for the nonlinear reflecting circuit of the present invention.

For convenience's sake, we have explained the present invention with respect to its operation on a unipolar pulse. However, those skilled in the trade can readily understand that pulse regenerating apparatuses for a bipolar pulse and various other patterns may be made in accordance with the principle of the present invention by making slight modification in the configuration of the circuits.

What we claim is:

1. A pulse regenerating repeater to be installed in cascade in a transmission line to regenerate the amplitude and fundamental period of an attenuated input pulse comprising a wave regenerating circuit having a bistate nonlinear negative resistance device for regeneration of a pulse upon the simultaneous subjection thereto of an input pulse and a timing pulse, a timing pulse delay line connected at one end in cascade to the output of said wave regenerating circuit and having a selected time period of propagation to govern said fundamental period for the regenerated pulse, and a reflecting circuit having its input connected in cascade to the other end of said delay line and having a nonlinear negative resistance device which reflects the portion of an incident pulse from said wave regenerating circuit below a preselected value back onto said delay line as said timing pulse and passes the portion above said preselected value for transmission, said wave regenerating circuit having reflection means to reflect an incident timing pulse from said delay line in the absence of said simultaneously subjected input pulse to permit the shuttling of said timing pulse back and forth over said delay line.

2. The pulse regenerating repeater of claim 1 characterized by amplification means in said reflecting circuit to amplify said reflected pulse and thereby compensate for the reflection loss of the wave regenerating circuit and transmission loss of said delay line.

3. The pulse regenerating repeater of claim 1 characterized in that said bistate nonlinear negative resistance device consists of an N-type (voltage regulated type) negative resistance device connected in parallel to the transmission line and performing bistable operation, and said reflecting circuit nonlinear negative resistance device consists of an S-type (current regulated) negative resistance device connected in parallel to the transmission line.

4. The pulse regenerating repeater of claim 1 characterized in that said bistate nonlinear negative resistance device consists of an N-type negative resistance device connected in parallel to the transmission line and performing monostable operation to generate a pulse having a width such that the sum of the time of said pulse width and the recovery time of said device is smaller than said fundamental period, and said reflecting circuit nonlinear negative resistance device consists of an N-type negative resistance device connected in series to the transmission line.

5. The pulse regenerating repeater of claim 1 characterized in that said bistate nonlinear negative resistance device consists of an N-type negative resistance device having bistable operation, and said reflecting circuit nonlinear negative resistance device consists of an S-type negative resistance device connected in parallel to the transmission line.

6. The pulse regenerating repeater of claim 1 characterized in that said bistate nonlinear negative resistance device consists of an N-type negative resistance device connected in series to the transmission line and performing monostable operation, and said reflecting circuit nonlinear negative resistance device consists of an N-type negative resistance device connected in series to the transmission line.

7. The pulse regenerating repeater of claim 1 characterized in that said bistate nonlinear negative resistance device consists of an S-type negative resistance device connected in series to the transmission line and performing bistable operation, and said reflecting circuit nonlinear negative resistance device consists of an N-type negative resistance device connected in series to the transmission line.

8. The pulse regenerating repeater of claim 1 characterized in that said bistate nonlinear negative resistance device consists of an S-type negative resistance device connected in series to the transmission line and performing monostable operation, and said reflecting circuit nonlinear negative resistance device consists of an S-type negative resistance device connected in parallel to the transmission line.

9. The pulse regenerating repeater of claim 1 characterized in that said bistate nonlinear negative resistance device consists of an S-type negative resistance device connected in parallel to the transmission line and performing bistable operation, and said reflecting circuit nonlinear negative resistance device consists of an N-type negative resistance device connected in series to the transmission line.

10. The pulse regenerating repeater of claim 1 characterized in that said bistate nonlinear negative resistance device consists of an S-type negative resistance device connected in parallel to the transmission line and performing monostable operation, and said reflecting circuit nonlinear negative resistance device consists of an S-type negative resistance device connected in parallel to the transmission line.

11. The pulse regenerating repeater of claim 1 wherein said delay line consists of a portion of transmission line.

12. The pulse regenerating repeater of claim 1 characterized by electric power supply means connected to said transmission line for the operation of said repeater by electric power supplied via said transmission line.

References Cited

UNITED STATES PATENTS

| | | | |
|---|---|---|---|
| 2,585,571 | 2/1952 | Mohr | 325—13X |
| 2,878,325 | 3/1959 | Merrill, Jr. | 179—170 |
| 3,124,648 | 3/1964 | Miller | 178—70 |
| 3,141,138 | 7/1964 | Oshima et al. | 179—170X |
| 2,502,942 | 4/1950 | Goodall | 179—15X |
| 2,868,965 | 1/1959 | DeLange | 179—15X |
| 2,912,583 | 11/1959 | Geyer, Jr. | 328—164 |
| 3,028,489 | 4/1962 | Chasek | 179—15X |
| 3,085,200 | 4/1963 | Goodall | 179—15X |
| 3,176,076 | 3/1965 | Hyman | 325—13X |

ROBERT L. GRIFFIN, Primary Examiner

A. H. HANDAL, Assistant Examiner